(12) United States Patent
Ito et al.

(10) Patent No.: US 11,021,618 B2
(45) Date of Patent: Jun. 1, 2021

(54) CURABLE COMPOSITION, LAMINATE, AND AUTOMOBILE HEADLAMP LENS

(71) Applicant: Mitsubishi Chemical Corporation, Tokyo (JP)

(72) Inventors: Jun Ito, Toyohashi (JP); Masashi Serizawa, Toyohashi (JP); Hiroyuki Satou, Chiyoda-ku (JP); Akira Miyachi, Toyohashi (JP); Riina Kanbara, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 15/300,361

(22) PCT Filed: Mar. 30, 2015

(86) PCT No.: PCT/JP2015/059881
§ 371 (c)(1),
(2) Date: Sep. 29, 2016

(87) PCT Pub. No.: WO2015/152140
PCT Pub. Date: Oct. 8, 2015

(65) Prior Publication Data
US 2017/0183515 A1    Jun. 29, 2017

(30) Foreign Application Priority Data
Mar. 31, 2014  (JP) ............................. JP2014-071226

(51) Int. Cl.
| | | |
|---|---|---|
| C08F 2/44 | (2006.01) |
| C08K 3/34 | (2006.01) |
| C08K 9/06 | (2006.01) |
| C09D 201/00 | (2006.01) |
| C09D 7/62 | (2018.01) |
| C09D 7/40 | (2018.01) |
| C08F 290/00 | (2006.01) |
| C08J 7/18 | (2006.01) |
| G02B 1/10 | (2015.01) |
| F21S 41/20 | (2018.01) |
| B60Q 1/04 | (2006.01) |
| C08K 3/36 | (2006.01) |
| C08K 5/00 | (2006.01) |
| G02B 27/00 | (2006.01) |
| G02B 1/111 | (2015.01) |
| C09D 4/00 | (2006.01) |
| C08K 3/26 | (2006.01) |
| G02B 1/14 | (2015.01) |
| G02B 1/18 | (2015.01) |

(52) U.S. Cl.
CPC .............. *C09D 7/62* (2018.01); *B60Q 1/04* (2013.01); *C08F 2/44* (2013.01); *C08F 290/00* (2013.01); *C08J 7/18* (2013.01); *C08K 3/36* (2013.01); *C08K 5/005* (2013.01); *C08K 9/06* (2013.01); *C09D 7/67* (2018.01); *C09D 7/68* (2018.01); *C09D 201/00* (2013.01); *F21S 41/20* (2018.01); *G02B 1/10* (2013.01); *C08J 2369/00* (2013.01); *C08J 2483/07* (2013.01); *C08K 3/26* (2013.01); *C09D 4/00* (2013.01); *G02B 1/111* (2013.01); *G02B 1/14* (2015.01); *G02B 1/18* (2015.01); *G02B 27/0006* (2013.01)

(58) Field of Classification Search
CPC . C08K 3/36; C08K 5/005; C08K 9/06; C09D 7/48; C09D 201/00; C09D 201/025; C08F 2/44
See application file for complete search history.

(56) References Cited

U.S. PATENT DOCUMENTS

| | | | | |
|---|---|---|---|---|
| 5,318,850 A * | 6/1994 | Pickett | ...................... | C09D 4/00 428/412 |
| 5,512,181 A * | 4/1996 | Matchett | ................ | B01D 61/16 210/634 |
| 5,695,851 A * | 12/1997 | Watanabe | ................ | C09D 4/00 428/147 |
| 5,811,472 A | 9/1998 | Patel | | |
| 5,990,188 A * | 11/1999 | Patel | .......................... | C08F 2/46 522/28 |
| 6,306,502 B1 * | 10/2001 | Fukushima | .............. | C09D 4/00 428/412 |

(Continued)

FOREIGN PATENT DOCUMENTS

| | | |
|---|---|---|
| EP | 0 442 305 A2 | 8/1991 |
| EP | 0 696 621 A1 | 2/1996 |

(Continued)

OTHER PUBLICATIONS

JP 2012-67157 (Apr. 5, 2012); machine translation in English (Year: 2012).*

(Continued)

*Primary Examiner* — Rip A Lee

(74) *Attorney, Agent, or Firm* — Oblon, McClelland, Maier & Neustadt, L.L.P.

(57) ABSTRACT

Provided are: a curable composition that makes it possible to form a cured film having excellent wear resistance and weather resistance; a laminate that is provided with the cured film; and an automobile headlamp lens. The curable composition makes it possible to obtain a cured film in which the relationship between a haze value ($\Delta$Hx) that is obtained by a wear resistance test and a haze value ($\Delta$Hy) that is obtained by a weather resistance test satisfies $\Delta$Hy$\leq$−0.3 $\Delta$Hx+5.0 when a cured film having a thickness of 10 μm is produced.

8 Claims, 1 Drawing Sheet

(56) References Cited

U.S. PATENT DOCUMENTS

| | | | |
|---|---|---|---|
| 9,670,167 B2 * | 6/2017 | Higuchi | ............... C07D 251/24 |
| 2011/0223414 A1 | 9/2011 | Higuchi et al. | |
| 2014/0378571 A1 | 12/2014 | Takahashi et al. | |

FOREIGN PATENT DOCUMENTS

| | | | |
|---|---|---|---|
| EP | 0 824 119 A2 | 2/1998 | |
| EP | 2 364 844 A2 | 9/2011 | |
| JP | 2007-186573 A | 7/2007 | |
| JP | 2011-144309 A | 7/2011 | |
| JP | 2011-183758 A | 9/2011 | |
| JP | 2011-219623 A | 11/2011 | |
| JP | 2012-67157 * | 4/2012 | .............. C08L 67/04 |
| JP | 2012-67157 A | 4/2012 | |
| JP | 2013-204029 A | 10/2013 | |
| WO | WO 99/02611 A1 | 1/1999 | |
| WO | WO 2005/066287 A1 | 7/2005 | |
| WO | WO 2013/118713 A1 | 8/2013 | |
| WO | WO 2014/011731 A1 | 1/2014 | |
| WO | WO 2015/019941 A1 | 2/2015 | |

OTHER PUBLICATIONS

Extended European Search Report dated Dec. 19, 2016 in patent application No. 15772294.3.

International Search Report dated Apr. 28, 2015 in PCT/JP2015/059881, filed Mar. 30, 2015.

Third Party Observations dated Nov. 5, 2018 in European Patent Application No. 15772294.3, 10 pages.

"Nanomaterial Information Sheet", Nissan Chemical Industries, Ltd., Ministry of Economy, Trade and Industry, Mar. 2011 (with partial English translation of p. 2 and p. 6), 17 pages.

Japanese Office Action dated Feb. 26, 2019 in Japanese Application No. 2015-517305, filed May 8, 2013 (with Computer Generated English Translation).

* cited by examiner

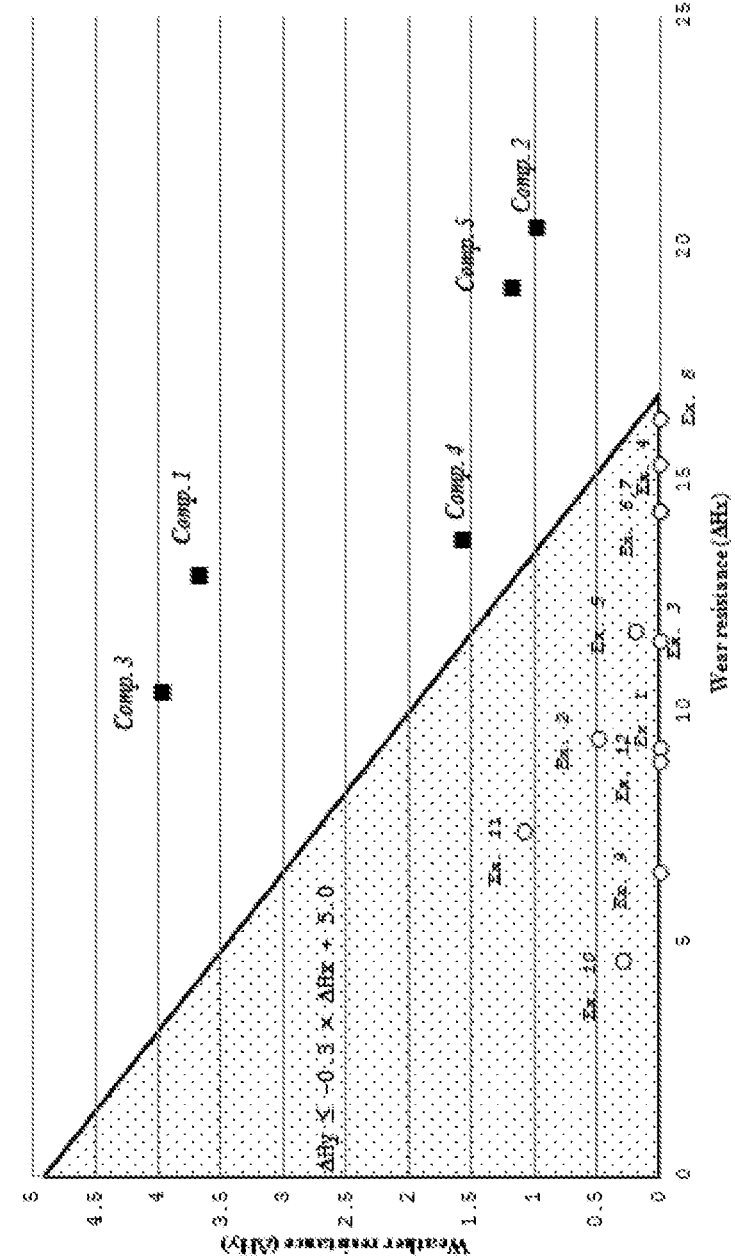

CURABLE COMPOSITION, LAMINATE, AND AUTOMOBILE HEADLAMP LENS

TECHNICAL FIELD

The present invention relates to a curable composition, a laminate, and an automobile headlamp lens.

BACKGROUND ART

A resin molded article containing a polycarbonate resin, a polymethylmethacrylate resin, a polystyrene resin, or the like is lightweight and excellent in moldability, has high transparency, and is excellent in impact resistance compared to glass products. Thus, the resin molded article is used, as a substitute for glass, in various lamp lenses, window materials, covers of meters and gauges, and the like. In addition, recently, in order to decrease an automobile in weight, a polycarbonate resin molded article excellent in impact resistance is used in a window glass or a sun roof. However, since the wear resistance of the surface of the polycarbonate resin molded article is low, damages easily occur on the surface by contact with another hard object, friction, or scratch, and the damages occurring on the surface deteriorates commodity value. Further, in a case where the polycarbonate resin molded article is used as an automobile member, since the automobile member is used outdoors, weather resistance is also important. A polycarbonate resin has low weather resistance and is deteriorated by active energy rays such as ultraviolet rays included in solar light, and yellowing occurs or cracks are generated on the surface. In order to solve the problems of such a polycarbonate resin molded article, a method is performed in which a composition obtained by adding an ultraviolet absorbing agent to an acrylic, melamine, urethane, or silicon resin is applied to the surface of the polycarbonate resin molded article, and the composition was cured by using heat or active energy rays such as ultraviolet rays and electron beams to form a cured film. In particular, the curing method using active energy rays has advantages such as excellent productivity compared to the thermal curing method, and thus is widely used.

However, if the wear resistance of a cured film is increased, flexibility of the cured film is lowered, and thus weather resistance is lowered. On the other hand, a cured film having excellent weather resistance has low wear resistance. As a material of a cured film by which both weather resistance and wear resistance, which are in a tradeoff relation, can be imparted to a polycarbonate resin molded article, a composition containing silica particles surface-modified with an acrylic compound is known (Patent Literature 1).

CITATION LIST

Patent Literature

Patent Literature 1: JP 2011-144309 A

SUMMARY OF THE INVENTION

Problem to be Solved by the Invention

However, from the viewpoint of preventing deterioration of a cured film and a substrate with respect to outdoor environment over a longer period of time, there is a demand for further improvement in wear resistance and weather resistance of the cured film.

An object of the invention is to provide a curable composition that makes it possible to form a cured film having excellent wear resistance and weather resistance, and a laminate and an automobile headlamp lens that include the cured film.

Means for Solving Problem

The invention relates to the following [1] to [14].

[1] A curable composition that makes it possible to form a cured film in which the relation between a haze value $\Delta Hx$, which is obtained by the following wear resistance test, and a haze value $\Delta Hy$, which is obtained by the following weather resistance test satisfies, $\Delta Hy \leq -0.3 \times \Delta Hx + 5.0$ when a cured film having a thickness of 10 μm is produced.

[Wear Resistance Test]

The surface of the cured film is subjected to a 500-rotation abrasion under a load of 500 g (4.90 N) using an abrasive wheel CS-10F (trade name, manufactured by Taber Industries) according to JIS K7204 "Plastics—Determination of Resistance to Wear by Abrasive Wheels."

[Weather Resistance Test]

A weather resistance test is carried out on the surface of the cured film at an irradiation intensity of 80 mW/cm² for 144 hours using a weather resistance tester (device name: METAL WEATHER, type: DAYPLA METAL WEATHER, KU-R4Ci-W type, manufactured by DAYPLA WINTES CO., LTD.). In the weather resistance test, operations at 63° C. for 8 hours, at 70° C. for 8 hours, and at 30° C. for 8 hours (24 hours in total) are designated as one cycle, and the test is carried out for 6 cycles.

[Measurement of Haze Values $\Delta Hx$ and $\Delta Hy$]

Haze values of the surface of the cured film before and after the wear resistance test or the weather resistance test are measured four times using a haze meter (trade name: HM-65W, manufactured by Murakami Color Research Laboratory) according to JIS-K7105 and then an average value of the haze values is calculated. A value obtained by subtracting the haze value before the wear resistance test from the haze value after the wear resistance test is designated as a haze value $\Delta Hx$. A value obtained by subtracting the haze value before the weather resistance test from the haze value after the weather resistance test is designated as a haze value $\Delta Hy$. The unit of the haze values $\Delta Hx$ and $\Delta Hy$ is percent (%).

[2] The curable composition described in [1], in which the $\Delta Hx$ and the $\Delta Hy$ further satisfy the relation: $\Delta Hx \geq 0$ and $\Delta Hy \geq 0$.

[3] The curable composition described in [1] or [2], further containing a compound (B) having one or more radically polymerizable unsaturated bonds and a photopolymerization initiator (D).

[4] The curable composition described in any one of [1] to [3], further containing inorganic particles (a) having an average primary particle diameter of 500 nm or less, the average primary particle diameter being converted, by using the following equation, from a specific surface area measured by a BET adsorption method defined in JIS Z8830.

$$\text{Average primary particle diameter } d(\text{nm}) = 6000/(S \cdot \rho)$$

S: specific surface area (unit: cm²/g) measured by the BET adsorption method defined in JIS Z8830
ρ: density (unit: g/cm³) of inorganic particles

[5] The curable composition described in [4], in which the inorganic particles (a) are silica particles and/or silica particles of which surfaces are surface-modified by reaction with a silane coupling agent.

[6] A curable composition containing: surface-modified silica particles (A) obtained by reacting a compound (a-2) represented by the following Formula (1) with silica particles (a-1) having an average primary particle diameter of 500 nm or less, the average primary particle diameter being converted from a specific surface area measured by a BET adsorption method defined in JIS Z8830; a compound (B) having one or more radically polymerizable unsaturated bonds; a compound represented by the following Formula (1) and/or a condensate thereof (C); and a photopolymerization initiator (D), in which a content of (A) is 10 to 50% by mass with respect to 100% by mass of (A) to (C) in total, a content of (B) is 50 to 90% by mass with respect to 100% by mass of (A) to (C) in total, a content of (C) is 0 to 0.08 times in mass with respect to (A), and a content of (D) is 0.01 to 10 parts by mass with respect to 100 parts by mass of (A) to (C) in total.

$$R^1{}_l\text{—}SiR^2{}_mR^3{}_n \qquad (1)$$

(In Formula (1), $R^1$ represents a functional group containing a (meth)acryloyl group, $R^2$ represents a hydrolyzable functional group or a hydroxyl group, and $R^3$ represents a substituent other than $R^1$ and $R^2$. In addition, l is an integer of 1 to 3, m is an integer of 1 to 3, and n is an integer of 0 to 2, provided that l+m+n=4.)

[7] The curable composition described in [6], in which the content of (A) is 10 to 40% by mass with respect to 100% by mass of (A) to (C) in total, and the content of (B) is 60 to 90% by mass with respect to 100% by mass of (A) to (C) in total.

[8] The curable composition described in [6] or [7], further containing an ultraviolet absorbing agent (E), in which a content of (E) is 1 to 20 parts by mass with respect to 100 parts by mass of (A) to (C) in total.

[9] The curable composition described in any one of [6] to [8], further containing a light stabilizer (F), in which a content of (F) is 0.01 to 3 parts by mass with respect to 100 parts by mass of (A) to (C) in total.

[10] A laminate including a cured film of the curable composition described in any one of [1] to [9] on a substrate.

[11] The laminate described in [10], in which a thickness of the cured film is 5 to 20 µm.

[12] An automobile headlamp lens including a cured film of the curable composition described in any one of [1] to [9] on a surface of a resin molded article.

[13] The automobile headlamp lens described in [12], in which a thickness of the cured film is 5 to 20 µm.

[14] The automobile headlamp lens described in [12] or [13], in which the resin molded article is a polycarbonate resin molded article.

Effect of the Invention

According to the invention, it is possible to provide a curable composition that makes it possible to form a cured film having excellent wear resistance and weather resistance, and a laminate and an automobile headlamp lens that include the cured film.

BRIEF DESCRIPTION OF DRAWINGS

FIG. 1 is a diagram illustrating the relation between weather resistance and wear resistance in Examples 1 to 12 and Comparative Examples 1 to 5.

MODE(S) FOR CARRYING OUT THE INVENTION

The present inventors conducted intensive studies in order to solve the above-described problems, and as a result, they found out that, when the amount of a compound, which is not surface-modified with silica particles, contained in preparation of the surface-modified silica particles is decreased, a cured film having excellent wear resistance, weather resistance, and adhesiveness is obtainable.

According to the curable composition of the invention, it is possible to obtain a cured film in which the relation of a haze value ΔHx obtained by the following wear resistance test and a haze value ΔHy obtained by the following weather resistance test satisfies, ΔHy≤−0.3×ΔHx+5.0 when a cured film having a thickness of 10 µm is produced. It is preferable that ΔHy satisfies ΔHy≤−0.3×ΔHx+4.5, and it is more preferable that ΔHy satisfies ΔHy≤−0.3×ΔHx+4.0.

In the invention, the wear resistance is evaluated by producing a cured film having a thickness of 10 µm by the following method and using the haze value ΔHx obtained by the following wear resistance test. In addition, the weather resistance is evaluated by producing a cured film having a thickness of 10 µm by the following method and using the haze value ΔHy obtained by the following weather resistance test.

[Production of Cured Film]

The curable composition is applied to a polycarbonate resin injection-molded plate (trade name: Panlite L-1225Z-100, clear, manufactured by TEIJIN LIMITED, thickness: 3 mm)) using a #26 bar coater and is heated and dried for 90 seconds in a dryer heated at 60° C. Then, the curable composition is irradiated with an ultraviolet ray of 1,800 mJ/cm² (integrated energy of ultraviolet ray having a wavelength of 320 to 380 nm, measured by UV-351 (trade name, manufactured by Orc Manufacturing Co., Ltd.) using a high pressure mercury lamp under air atmosphere to thereby obtain a wear resistance polycarbonate resin plate (laminate) provided with a cured film having a thickness of 10 µm. The following wear resistance test and weather resistance test are performed on the cured film.

[Wear Resistance Test]

The surface of the cured film is subjected to a 500-rotation abrasion under a load of 500 g (4.90 N) using an abrasive wheel CS-10F (trade name, manufactured by Taber Industries) according to JIS K7204 "Plastics—Determination of Resistance to Wear by Abrasive Wheels."

[Weather Resistance Test]

A weather resistance test is carried out on the surface of the cured film at an irradiation intensity of 80 mW/cm² for 144 hours using a weather resistance tester (device name: METAL WEATHER, type: DAYPLA METAL WEATHER, KU-R4Ci-W type, manufactured by DAYPLA WINTES CO., LTD.). In the weather resistance test, operations at 63° C. for 8 hours, at 70° C. for 8 hours, and at 30° C. for 8 hours (24 hours in total) are designated as one cycle, and the test is carried out for 6 cycles.

[Measurement of Haze Values ΔHx and ΔHy]

Haze values of the surface of the cured film before and after the wear resistance test or the weather resistance test are measured four times using a haze meter (trade name: HM-65W, manufactured by Murakami Color Research Laboratory) according to JIS-K7105 and then an average value of the haze values is calculated. A value obtained by subtracting the haze value before the wear resistance test from the haze value after the wear resistance test is designated as a haze value ΔHx. A value obtained by subtracting the haze value before the weather resistance test from the haze value after the weather resistance test is designated as a haze value ΔHy. The unit of the haze values ΔHx and ΔHy is percent (%). In general, the haze values ΔHx and ΔHy satisfy ΔHx≥0 and ΔHy≥0.

Each component contained in the curable composition according to the invention will be described below; however, the invention is not limited thereto. Incidentally, "(meth)acryl" described in the invention means either "acryl" or "methacryl."

It is preferable that the curable composition according to the invention contains a compound (B) having one or more radically polymerizable unsaturated bonds (hereinafter, also referred to as the component (B)) and a photopolymerization initiator (D) (hereinafter, also referred to as the component (D)) from the viewpoint that a cured film excellent in wear resistance and weather resistance can be produced in a short time.

Further, it is preferable that the curable composition according to the invention contains inorganic particles (a) (hereinafter, also referred to as the component (a)) having an average primary particle diameter of 500 nm or less, the average primary particle diameter being converted, by using the following equation, from a specific surface area measured by a BET adsorption method defined in JIS Z8830, from the viewpoint of improving wear resistance of a cured film of the curable composition.

Average primary particle diameter $d(nm)=6000/(S \cdot \rho)$

S: specific surface area (unit: cm$^2$/g) measured by the BET adsorption method defined in JIS Z8830

ρ: density (unit: g/cm$^3$) of inorganic particles

Incidentally, a value of the true specific gravity described in Industrial Inorganic Chemicals of "Kagaku Binran Ouyohen (Handbook of Chemistry: Applied Chemistry)," edited by The Chemical Society of Japan, Revised 3rd edition, Tokyo, MARUZEN Co., Ltd., 1980, 2 is used as the density of the inorganic particles.

[Component (B)]

The component (B) is a compound having one or more radically polymerizable unsaturated bonds. The component (B) is not particularly limited as long as it is a monomer or oligomer having one or more radically polymerizable unsaturated bonds. Examples of the component (B) include (meth)acrylate, a styrene compound, a maleimide compound, and fumarate ester. These may be used singly or in combination of two or more kinds thereof.

The (meth)acrylate may be either monofunctional (meth)acrylate or polyfunctional (meth)acrylate.

Examples of the monofunctional (meth)acrylate include ethyl (meth)acrylate, butyl (meth)acrylate, ethylhexyl (meth)acrylate, 2-hydroxyethyl (meth)acrylate, isobornyl (meth)acrylate, tetrafurfuryl (meth)acrylate, pentaerythritol mono(meth)acrylate, and dipentaerythritol mono(meth)acrylate.

Examples of the polyfunctional (meth)acrylate include 1,4-butanediol di(meth)acrylate, 1,6-hexanediol di(meth)acrylate, tetraethylene glycol di(meth)acrylate, neopentyl glycol di(meth)acrylate, ethylene glycol di(meth)acrylate, polyethylene glycol (n=2 to 15) di(meth)acrylate, polypropylene glycol (n=2 to 15) di(meth)acrylate, polybutylene glycol (n=2 to 15) di(meth)acrylate, 2,2-bis(4-(meth)acryloxyethoxyphenyl)propane, 2,2-bis(4-(meth)acryloxydiethoxyphenyl)propane, trimethylol propane diacrylate, bis(2-(meth)acryloxyethyl)-hydroxyethyl-isocyanurate, trimethylol propane tri(meth)acrylate, tris(2-(meth)acryloxyethyl)isocyanurate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra(meth)acrylate, dipentaerythritol penta(meth)acrylate, dipentaerythritol hexa(meth)acrylate, caprolactone-modified dipentaerythritol hexa(meth)acrylate (a (meth)acrylation product of an adduct of dipentaerythritol and ε-caprolactone), caprolactone-modified dipentaerythritol hydroxy penta(meth)acrylate, and ditrimethylol propane tetra(meth)acrylate.

Further, in addition to the above-described examples, examples of the (meth)acrylate include epoxy poly(meth)acrylate such as epoxy di(meth)acrylate in which bisphenol A type diepoxy is reacted with (meth)acrylic acid, urethane tri(meth)acrylate in which a trimer of 1,6-hexamethylene diisocyanate is reacted with 2-hydroxyethyl (meth)acrylate, urethane di(meth)acrylate in which isophorone diisocyanate is reacted with 2-hydroxypropyl (meth)acrylate, urethane hexa(meth)acrylate in which isophorone diisocyanate is reacted with pentaerythritol tri(meth)acrylate, urethane di(meth)acrylate in which dicyclomethane diisocyanate is reacted with 2-hydroxyethyl (meth)acrylate, urethane poly(meth)acrylate such as urethane di(meth)acrylate in which 2-hydroxyethyl (meth)acrylate is reacted with a urethane reaction product of dicyclomethane diisocyanate and poly (n=6 to 15) tetramethylene glycol, polyester (meth)acrylate in which trimethylol ethane, succinic acid, and (meth)acrylic acid are reacted, and polyester poly(meth)acrylate such as polyester (meth)acrylate in which trimethylol propane, succinic acid, ethylene glycol, and (meth)acrylic acid are reacted. There may be used singly or in combination of two or more kinds thereof.

Of these, from the viewpoint of having excellent photopolymerization property and easily performing curing even near room temperature, (meth)acrylates are preferable as the component (B). Of them, polyfunctional (meth)acrylates are more preferable. Of them, tris(2-(meth)acryloxyethyl)isocyanurate, dipentaerythritol di(meth)acrylate, dipentaerythritol tri(meth)acrylate, dipentaerythritol tetra(meth)acrylate, dipentaerythritol penta(meth)acrylate, dipentaerythritol hexa(meth)acrylate, caprolactone-modified dipentaerythritol hexa(meth)acrylate (a (meth)acrylation product of an adduct of dipentaerythritol and ε-caprolactone), caprolactone-modified dipentaerythritol hydroxy penta(meth)acrylate, ditrimethylol propane tetra(meth)acrylate, and the like are more preferable. These may be used singly or in combination of two or more kinds thereof.

[Component (D)]

The component (D) is a photopolymerization initiator. The component (D) is not particularly limited as long as it generates radicals by irradiation of active energy rays and can polymerize a polymerizable monomer and oligomer, and the component (D) can be suitably selected from the viewpoint of compatibility in the curable composition. Examples of the component (D) include carbonyl compounds such as benzoin, benzoin methyl ether, benzoin ethyl ether, benzoin isopropyl ether, benzoin isobutyl ether, acetoin, butyroin, toluoin, benzyl, benzophenone, p-methoxybenzophenone, diethoxyacetophenone, 2,2-dimethoxy-2-phenylacetophenone (benzyl dimethyl ketal), 2,2-dimethoxy-1,2-diphenyl ethane-1-one, methylphenylglyoxylate, ethyl phenylglyoxylate, 4,4-bis(dimethylamino benzophenone), 2-hydroxy-2-methyl-1-phenylpropane-1-one, 1-hydroxycyclohexyl phenyl ketone, and 1-(4-isopropylphenyl)-2-hydroxy-2-methylpropane-1-one, sulfur compounds such as tetramethylthiuram disulfide; azo compounds such as azobisisobutyronitrile and azobis-2,4-dimethylvaleronitrile; peroxide compounds such as benzoyl peroxide and tertiary butyl peroxide; and acylphosphine oxide compounds such as 2,4,6-trimethylbenzoyl diphenylphosphine oxide and bis(2,6-dimethoxybenzoyl)-2,4,4-trimethylpentyl phosphine oxide.

Of these, carbonyl compounds and acylphosphine oxide compounds are preferable as the component (D). Of them, benzophenone, methylphenylglyoxylate, 2-hydroxy-2-methyl-1-phenylpropane-1-one, 1-hydroxycyclohexyl phenyl ketone, 2,2-dimethoxy-1,2-diphenylethane-1-one, and 2,4,6-trimethylbenzoyl diphenylphosphine oxide are more preferable as the component (D). These may be used singly or in combination of two or more kinds thereof.

[Component (a)]

The average primary particle diameter of the inorganic particles serving as the component (a) is 500 nm or less from the viewpoint of transparency of a cured film. The average primary particle diameter of the inorganic particles is preferably 100 nm or less and more preferably 50 nm or less. Examples of the inorganic particles include silica particles, alumina particles, silver particles, gold particles, copper oxide particles, iron oxide particles, cobalt oxide particles, titanium oxide particles, zinc oxide particles, zirconium oxide particles, cerium oxide particles, hydroxyapatite particles, fullerene particles, graphene particles, graphene oxide particles, carbon nanotube particles, diamond particles, mesoporous carbon particles, SiC particles, and TiC particles. These inorganic particles may or may not be surface-modified. Of them, from the viewpoint of wear resistance and transparency of a cured film, silica particles and/or silica particles of which surfaces are surface-modified by reaction with a silane coupling agent are preferable, and surface-modified silica particles (A) described below are more preferable. These may be used singly or in combination of two or more kinds thereof.

From the viewpoint of obtaining a cured film excellent in wear resistance and weather resistance, it is preferable that the curable composition according to the invention contains: surface-modified silica particles (A) (hereinafter, also referred to as the component (A)) obtained by reacting a compound (a-2) (hereinafter, also referred to as the component (a-2)) represented by the following Formula (1) with silica particles (a-1) (hereinafter, also referred to as the component (a-1)) having an average primary particle diameter of 500 nm or less, the average primary particle diameter being converted from a specific surface area measured by a BET adsorption method defined in JIS Z8830; the compound (B) having one or more radically polymerizable unsaturated bonds; a compound represented by the following Formula (1) and/or a condensate thereof (C) (hereinafter, also referred to as the component (C)); and the photopolymerization initiator (D) in the contents thereof described below. The content of the component (A) is 10 to 50% by mass with respect to 100% by mass of the components (A) to (C) in total, the content of the component (B) is 50 to 90% by mass with respect to 100% by mass of the components (A) to (C) in total, the content of the component (C) is 0 to 0.08 times in mass with respect to the component (A), and the content of the component (D) is 0.01 to 10 parts by mass with respect to 100 parts by mass of the components (A) to (C) in total.

$$R^1{}_l\text{—}SiR^2{}_mR^3{}_n \quad (1)$$

In Formula (1), le represents a functional group containing a (meth)acryloyl group, $R^2$ represents a hydrolyzable functional group or a hydroxyl group, and $R^3$ represents a substituent other than $R^1$ and $R^2$. In addition, l is an integer of 1 to 3, m is an integer of 1 to 3, and n is an integer of 0 to 2, provided that l+m+n=4.

[Component (A)]

The component (A) is surface-modified silica particles and is obtained by reacting the component (a-1) and the component (a-2). The surface of the component (a-1) that is silica particles is chemically modified by the component (a-2).

The content of the component (A) in the curable composition is 10 to 50% by mass with respect to 100% by mass of the components (A) to (C) in total from the viewpoint that the balance between wear resistance and weather resistance can be achieved when a cured film is formed. In order to obtain high wear resistance, the content thereof is preferably 12% by mass or more and more preferably 15% by mass or more. In addition, from the viewpoint of suppressing occurrence of defective appearance such as cracks, the content thereof is preferably 40% by mass or less and more preferably 35% by mass or less.

[Component (a-1)]

The component (a-1) is silica particles having an average primary particle diameter of 500 nm or less. The average primary particle diameter of the silica particles is 500 nm or less from the viewpoint of transparency of a cured film. The average primary particle diameter of the silica particles is preferably 100 nm or less and more preferably 50 nm or less. Incidentally, the average primary particle diameter of the silica particles is a value converted from a specific surface area measurement value (according to JIS Z8830) by a BET adsorption method, and is measured by the same measurement method as in the inorganic particles (a).

Examples of such silica particles include colloidal silica. Herein, the colloidal silica indicates one obtained by dispersing ultrafine particles of silicic anhydride in an appropriate liquid solvent. The colloidal silica can be used in the form in which colloidal silica is dispersed in water or in an organic solvent. However, from the viewpoint of uniformly dispersing a silane coupling agent serving as the component (a-2), the colloidal silica is preferably used in the form in which colloidal silica is dispersed in an organic solvent.

Examples of the organic solvent include methanol, isopropyl alcohol, n-butanol, ethylene glycol, dimethylacetamide, ethylene glycol mono-n-propyl ether, propylene glycol monomethyl ether, propylene glycol monomethyl ether acetate, methyl ethyl ketone, methyl isobutyl ketone, ethyl acetate, n-butyl acetate, xylene, and toluene. These may be used singly or in combination of two or more kinds thereof. Incidentally, from the viewpoint that the solid content concentration of the solution of the surface-modified silica particles can be adjusted by distillation, the boiling point of the organic solvent is preferably 150° C. or lower.

Examples of the colloidal silica in the form in which colloidal silica is dispersed in an organic solvent include methanol-dispersed silica sol (MA-ST, MA-ST-M), isopropyl alcohol-dispersed silica sol (IPA-ST, IPA-ST-L, IPA-ST-ZL, IPA-ST-UP), ethylene glycol-dispersed silica sol (EG-ST, EG-ST-L), dimethylacetamide-dispersed silica sol (DMAC-ST, DMAC-ST-L), xylene/butanol-dispersed silica sol (XBA-ST), methyl ethyl ketone-dispersed silica sol (MEK-ST, MEK-ST-L, MEK-ST-ZL, MEK-ST-UP), methyl isobutyl ketone-dispersed silica sol (MIBK-ST), propylene glycol monomethyl ether acetate-dispersed silica sol (PMA-ST), and ethyl acetate-dispersed silica sol (EAC-ST) (the above descriptions in parentheses are trade names manufactured by Nissan Chemical Industries, Ltd.). These may be used singly or in combination of two or more kinds thereof.

[Component (a-2)]

The component (a-2) is a compound represented by the following Formula (1).

$$R^1{}_l\text{—}SiR^2{}_m R^3{}_n \quad (1)$$

In Formula (1), $R^1$ represents a functional group containing a (meth)acryloyl group, $R^2$ represents a hydrolyzable functional group or a hydroxyl group, and $R^3$ represents a substituent other than $R^1$ and $R^2$. In addition, l is an integer of 1 to 3, m is an integer of 1 to 3, and n is an integer of 0 to 2, provided that l+m+n=4.

The dispersion uniformity of the obtained component (A) of the surface-modified silica particles and the component (B) can be improved in such a manner that a silane coupling agent having a (meth)acryloyl group serving as the component (a-2) is hydrolyzed to obtain a silanol compound and the silanol compound and silica particles serving as the component (a-1) are subjected to dehydration-condensation reaction. Further, it is possible to form reactive silica particles which can form a chemical bond with the radically polymerizable unsaturated bond in the component (B) and has active energy ray curing property.

Examples of $R^1$ include a (meth)acryloylalkyl group and a (meth)acryloyloxyalkyl group. Examples of each alkyl group of the (meth)acryloylalkyl group and the (meth)acryloyloxyalkyl group include an alkyl group having 1 to 10 carbon atoms. Examples of the (meth)acryloylalkyl group include a (meth)acryloylmethyl group, a (meth)acryloylethyl group, a (meth)acryloylpropyl group, and a (meth)acryloylbutyl group. Examples of the (meth)acryloyloxyalkyl group include a (meth)acryloyloxymethyl group, a (meth)acryloyloxyethyl group, and a (meth)acryloyloxypropyl group. In a case where 1 of $R^1$ in Formula (1) is 2 or 3, $R^1$'s may be the same group as each other or different groups from each other.

The hydrolyzable functional group of $R^2$ represents a functional group which can be substituted with a hydroxyl group by reaction with water. Examples of the hydrolyzable functional group of $R^2$ include a halogen group, an alkoxy group, and an ester group. Examples of the halogen group include fluorine, chlorine, bromine, and iodine. Examples of the alkoxy group include a methoxy group, an ethoxy group, and a propoxy group. Of these, an alkoxy group is preferable as the hydrolyzable functional group of $R^2$. In a case where m of $R^2$ in Formula (I) is 2 or 3, $R^2$'s may be the same group as each other or different groups from each other.

$R^3$ is an arbitrary substituent and a substituent other than $R^1$ and $R^2$. Examples of $R^3$ include an alkyl group such as a methyl group, an ethyl group, or a propyl group.

Examples of the component (a-2) include 2-(meth)acryloylethylmethyldimethoxysilane, 2-(meth)acryloylethyltrimethoxysilane, 2-(meth)acryloylethylmethyldiethoxysilane, 2-(meth)acryloylethyltriethoxysilane, 2-(meth)acryloylethyltrihydroxysilane, 2-(meth)acryloylethylethyldimethoxysilane, 2-(meth)acryloylethylpropyldimethoxysilane, 3-(meth)acryloylpropylmethyldimethoxysilane, 3-(meth)acryloylpropyltrimethoxysilane, 3-(meth)acryloylpropylmethyldiethoxysilane, 3-(meth)acryloylpropyltriethoxysilane, 3-(meth)acryloylpropyltrihydroxysilane, 3-(meth)acryloylpropylethyldimethoxysilane, 3-(meth)acryloylpropylpropyldimethoxysilane, 4-(meth)acryloylbutylmethyldimethoxysilane, 4-(meth)acryloylbutyltrimethoxysilane, 4-(meth)acryloylbutylmethyldiethoxysilane, 4-(meth)acryloylbutyltriethoxysilane, 4-(meth)acryloylbutyltrihydroxysilane, 4-(meth)acryloylbutylethyldimethoxysilane, and 4-(meth)acryloylbutylpropyldimethoxysilane. These may be used singly or in combination of two or more kinds thereof.

In addition, as the component (a-2), a silane coupling agent in which m in Formula (1) is 3 (in this case, necessarily, 1 is 1 and n is 0) is preferably used. The silane coupling agent in which m is 3 is hydrolyzed more easily compared to a silane coupling agent in which m is 1 or 2, and has excellent reactivity with the silica particles (a-1). Thus, the surface modification effect with respect to the silica particles (a-1) is increased. For this reason, the curable composition using the silica particles (A) surface-modified by the silane coupling agent in which m is 3 is excellent in stability and a cured film thereof is excellent in wear resistance and weather resistance. Particularly, from the viewpoint of ease of availability, 2-(meth)acryloylethyltrimethoxysilane, 2-(meth)acryloylethyltriethoxysilane, 3-(meth)acryloylpropyltrimethoxysilane, or 3-(meth)acryloylpropyltriethoxysilane is preferable as the component (a-2).

The production method of the surface-modified silica particles serving as the component (A) is not particularly limited. For example, there is mentioned a method of adding and mixing the component (a-2) into the component (a-1) dispersed in a solvent and then performing hydrolysis and dehydration-condensation reaction.

In the above method, the content (solid content) of the component (a-1) in the dispersion liquid is preferably 10 to 70% by mass. In addition, from the viewpoint of improving dispersion stability of the component (a-1), the content thereof is more preferably 15 to 60% by mass.

Although depending on the component (a-1) to be used, the use amount of the component (a-2) is preferably such an amount that the unreacted product with the component (a-1) is decreased when the component (A) is produced. For example, the use amount of the component (a-2) is preferably 5 to 50 parts by mass and more preferably 5 to 20 parts by mass with respect to 100 parts by mass of the component (a-1).

As the method of hydrolysis and dehydration-condensation reaction, for example, there is mentioned a method of subjecting a dispersion solvent of the component (a-1), water, and a lower alcohol, which is obtained by hydrolysis reaction, to azeotropic distillation together with a non-polar solvent such as toluene under atmospheric pressure or reduced pressure, substituting the dispersion solvent with the non-polar solvent, and then stirring under heating.

In the hydrolysis reaction, in a case where water is contained in the component (a-1) or the component (a-2), water may not be added; however, it is preferable to add water in order to allow reaction to progress. The added amount of water is 0.1 to 5 times the mole number of the component (a-2). In addition, in the hydrolysis reaction, a catalyst may not be used; however, as necessary, it is preferable that 0.5 to 0.6 mol, with respect to 1 mol of the component (a-2), of 0.001 to 0.1 mol/L of hydrolysis catalyst such as hydrochloric acid or acetic acid aqueous solution is added and stirred in room temperature or under heating.

[Content of Component (B)]

From the viewpoint that the balance between wear resistance and weather resistance can be achieved when a cured film is formed, the content of the component (B) in the curable composition is 50 to 90% by mass with respect to 100% by mass of the components (A) to (C) in total. The content thereof is preferably 55 to 90% by mass, more preferably 60 to 90% by mass, and still more preferably 65 to 88% by mass.

[Component (C)]

The component (C) is a side product generated in the course of producing the component (a-2) used when the component (A) is produced and/or the component (A), and is the compound represented by the above Formula (1) and/or a condensate thereof. As the component (C), for example, there is mentioned the unreacted component (a-2) not covered with the component (a-1) when the component (A) is synthesized or a compound which is separately added when the curable composition is prepared. The component (C) may be the same as or different from the component (a-2).

Examples of the condensate of the compound represented by the above Formula (1) include compounds represented by the following Formulae (2) to (4).

[Chem. 1]

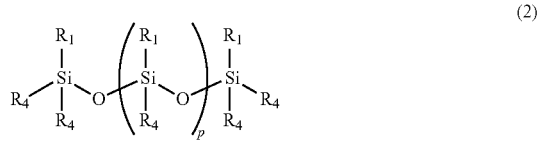

(2)

In Formula (2), $R_1$ represents a functional group containing a (meth)acryloyl group, and $R_4$ represents a substituent of any one of $R_1$, $R^2$ in the above Formula (1), $R^3$ in the above Formula (1), OH, and $R_7$. Incidentally, $R_7$ represents a structure derived from alcohol such as an alkoxy group contained when the component (A) is synthesized or contained in a coating material, and examples thereof include a methoxy group, an ethoxy group, a propoxy group, an isopropoxy group, an n-butoxy group, an i-butoxy group, a t-butoxy group, and a 1-methoxy-2-propoxy group. In addition, p represents an integer of 0 to 10.

[Chem. 2]

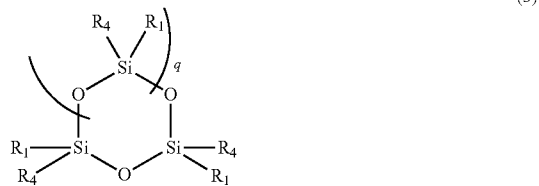

(3)

In Formula (3), $R_1$ and $R_4$ have the same meaning as in Formula (2). q represents an integer of 0 to 10.

[Chem. 3]

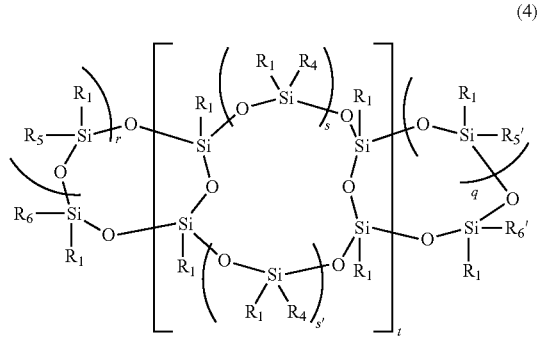

(4)

In Formula (4), $R_1$ and $R_4$ have the same meaning as in Formula (2). $R_5$ and $R_{5'}$ represent a substituent of any one of $R_1$, $R^2$ in the above Formula (1), $R^3$ in the above Formula (1), OH, and $R_7$ in the above Formula (2), or represent that $R_5$ and $R_{5'}$ are bonded to each other with an ether bond. In addition, $R_6$ and $R_{6'}$ represent a substituent of any one of $R_1$, $R^2$ in the above Formula (1), $R^3$ in the above Formula (1), OH, and $R_7$ in the above Formula (2), or represent that $R_6$ and $R_{6'}$ are bonded to each other with an ether bond. r and q represent an integer of 0 to 10 and satisfy r+q≥1. s and s' represent an integer of 0 to 10 and t represents an integer of 0 to 10.

The content of the component (C) in the curable composition is 0.08 times in mass or less with respect to the component (A) from the viewpoint of improving weather resistance of a cured film. In addition, the content thereof is preferably 0.06 times in mass or less and more preferably 0.04 times in mass or less. As the content of the component (C) is decreased, the weather resistance of the cured film is improved, and thus the component (C) may not be contained. Incidentally, since it is not easy to completely remove the unreacted component (a-2) not covered with the component (a-1) when the component (A) is synthesized, it is preferable to decrease the content of the component (C) as far as possible. In order to decrease the content of the component (C), it is preferable that the use amount of the component (a-2) is decreased, a solvent azeotropic with water at a lower boiling point is selected, and then hydrolysis reaction and dehydration-condensation reaction are performed. Examples of such a solvent include ethyl acetate, methyl ethyl ketone, ethanol, and isopropanol, and of these, ethyl acetate and methyl ethyl ketone are more preferable. Incidentally, the content of the component (C) can be measured by the following method.

[Measurement Method of Content of Component (C)]

A reprecipitation operation is performed by adding a reaction solution obtained by reacting the component (a-1) and the component (a-2) with hexane. After solid-liquid separation, the hexane solution is concentrated to dryness to obtain the component (C). The content of the component (C) is calculated from the ratio of the mass of the obtained component (C) to the mass of the reaction solution obtained by reacting the component (a-1) and the component (a-2).

[Content of Component (D)]

The content of the component (D) in the curable composition is 0.01 to 10 parts by mass with respect to 100 parts by mass of the components (A) to (C). The content thereof is preferably 0.01 to 8 parts by mass, more preferably 1 to 7 parts by mass, and still more preferably 2 to 6 parts by mass.

In order to further improve weather resistance and durability, it is preferable that the curable composition further contains an ultraviolet absorbing agent (E) (hereinafter, also referred to as the component (E)) and a light stabilizer (F) (hereinafter, also referred to as the component (F)).

[Component (E)]

The component (E) is an ultraviolet absorbing agent. The component (E) is not particularly limited and can be used as long as it is uniformly dissolved in the curable composition and has favorable weather resistance. As the component (E), there is preferably mentioned an ultraviolet absorbing agent that is a compound derived from benzophenone, benzotriazole, hydroxyphenyltriazine, phenyl salicylate, or phenyl benzoate and has a maximum absorption wavelength ranging from 240 to 380 nm, from the viewpoint of favorable solubility with respect to the curable composition and high weather resistance improvement effect. Particularly, from the viewpoint that a large amount of the component (E) can be contained in the curable composition, as the component (E), a benzophenone-based or hydroxyphenyltriazine-based ultraviolet absorbing agent is preferable. In addition, from the viewpoint that, when polycarbonate or the like is used as a substrate, yellowing of the substrate can be prevented, a benzotriazole-based or hydroxyphenyltriazine-based ultraviolet absorbing agent is preferable as the component (E).

Examples of the benzophenone-based ultraviolet absorbing agent include 2-hydroxybenzophenone, 5-chloro-2-hydroxybenzophenone, 2,4-dihydroxybenzophenone, 2-hydroxy-4-methoxybenzophenone, 2-hydroxy-4-octyloxy benzophenone, 4-dodecyloxy-2-hydroxybenzophenone, 2-hydroxy-4-octadecyloxy benzophenone, 2,2'-dihydroxy-4-methoxybenzophenone, and 2,2'-dihydroxy-4,4'-dimethoxybenzophenone. Examples of the benzotriazole-based ultraviolet absorbing agent include 2-(2-hydroxy-5-methylphenyl)benzotriazole, 2-(2-hydroxy-5-tert-butylphenyl) benzotriazole, 2-(2-hydroxy-3,5-di-tert-butylphenyl)-5-chlorobenzotriazole, 2-(2-hydroxy-3,5-di-tert-butylphenyl) benzotriazole, 2-(2-hydroxy-5-tert-octylphenyl) benzotriazole, and 2-(2'-hydroxy-5'-methacryloyloxyethylphenyl)-2H-benzotriazole. Examples of the hydroxyphenyltriazine-based ultraviolet absorbing agent include 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2-[4-[(2-hydroxy-3-(2'-ethyl)oxy)-2-hydroxyphenyl]-4,6-bis(2,4-dimethylphenyl)-1,3,5-tri azine, 2,4-bis(2-hydroxy-4-butyl oxyphenyl)-6-(2,4-bis-butyloxyphenyl)-1,3,5-triazine, and 2-(2-hydroxy-4-[1-octyloxycarbonyl ethoxy]phenyl)-4,6-bis(4-phenyl phenyl)-1,3,5-tri azine. Examples of the phenyl salicylate-based ultraviolet absorbing agent include phenyl salicylate, p-tert-butylphenyl salicylate, and p-(1,1,3,3-tetramethylbutyl)phenyl salicylate. Examples of the phenyl benzoate-based ultraviolet absorbing agent include 3-hydroxyphenyl benzoate and phenyl ene-1,3-dibenzoate.

Of these, as the component (E), a benzotriazole-based or hydroxyphenyltriazine-based ultraviolet absorbing agent is preferable. Of them, as the component (E), 2-(2-hydroxy-5-tert-butylphenyl)benzotriazole, 2-(2'-hydroxy-5'-methacryloyloxyethylphenyl)-2H-benzotriazole, 2-[4-[(2-hydroxy-3-dodecyloxypropyl)oxy]-2-hydroxyphenyl]-4,6-bis (2,4-dimethylphenyl)-1,3,5-triazine, and 2-(2-hydroxy-4-[1-octyloxycarbonylethoxy]phenyl)-4,6-bis(4-phenylphenyl)-1,3,5-triazine are more preferable. These may be used singly or in combination of two more kinds thereof.

The content of the component (E) in the curable composition is preferably 1 to 20 parts by mass, more preferably 1 to 10 parts by mass, and still more preferably 1 to 5 parts by mass with respect to 100 parts by mass of the components (A) to (C) in total, from the viewpoint that weather resistance can be imparted to a cured film without a decrease in curing property.

[Component (F)]

The component (F) is a light stabilizer. In particular, when the component (F) is used together with the component (E), the weather resistance of the cured film can be further improved. Examples of the component (F) include hindered amine-based light stabilizers. Examples of the hindered amine-based light stabilizers include bis(1,2,2,6,6-pentamethyl-4-piperidyl)sebacate, bis(2,2,6,6-tetramethyl-4-piperidyl)sebacate, 2-(3,5-di-tert-butyl-4-hydroxy benzyl)-2-n-butyl malonate bis(1,2,2,6,6-pentamethyl-4-piperidyl), 2,4-bis [N-butyl-(1-cyclohexyl oxy-2,2,6,6-tetramethylpiperidine-4-yl)amino]-6-(2-hydroxyethylamine)-1,3,5-triazine, and a reaction product of sebacic acid and bis(2,2,6,6-tetramethyl-1-(octyloxy)-4-piperidinyl)ester. Of these, as the component (F), bis(1,2,2,6,6-pentamethyl-4-piperidyl)sebacate and a reaction product of sebacic acid and bis(2,2,6,6-tetramethyl-1-(octyloxy)-4-piperidinyl) ester are preferable. These may be used singly or in combination of two or more kinds thereof.

The content of the component (F) in the curable composition is preferably 0.01 to 3 parts by mass, more preferably 0.05 to 2 parts by mass, and still more preferably 0.05 to 1 part by mass with respect to 100 parts by mass of the components (A) to (C) in total, from the viewpoint that weather resistance and durability can be imparted to a cured film without a decrease in curing property.

[Other Components]

The curable composition may further contain, as necessary, a solvent, an antioxidant, a yellow turning inhibitor, a bluing agent, a pigment, a leveling agent, an antifoaming agent, a thickener, an antisettling agent, an antistatic agent, an antifogging agent, or the like.

The solvent is used when the component (A) is produced; however, the solvent may also be used for uniformly dissolving the curable composition or facilitating application. The solvent to be used as an arbitrary component can improve uniform solubility of the curable composition, dispersion stability, adhesiveness with the substrate, and flatness and homogeneity of a cured film. The solvent usable for these purposes is not particularly limited and examples thereof include organic solvents of alcohol, hydrocarbon, halogenated hydrocarbon, ether, ketone, ester, and a polyhydric alcohol derivative. These may be used singly or in combination of two or more kinds thereof. The content of the solvent in the curable composition is preferably 100 to 500 parts by mass and more preferably 150 to 300 parts by mass with respect to 100 parts by mass of the components (A) to (C) in total.

The laminate according to the invention includes a cured film of the curable composition according to the invention on a substrate. The thickness of the cured film is preferably 5 to 20 µm and more preferably 7 to 15 µm from the viewpoint that a cured film excellent in weather resistance and wear resistance can be produced in a short time. The cured film can be formed by applying the curable composition onto the substrate and irradiating the curable composition with active energy rays. As the method of applying the curable composition to the substrate, brush coating, spray coating, dip coating, flow coating, spin coating, curtain coating, and bar coater methods can be used. Form the viewpoint of improving application workability of the curable composition, flatness of a coated film, homogeneity, and adhesiveness of the cured film with the substrate, it is preferable that application is performed by adding an appropriate organic solvent to the curable composition. In addition, in order to adjust the viscosity of the curable composition, the curable composition may be heated and then applied.

The curable composition applied onto the substrate is cross-linked by irradiation of active energy rays to form a cured film. In a case where the curable composition is cured by irradiation of ultraviolet rays, the curable composition is applied onto a substrate, for example, such that the thickness of the coated film is preferably 1 to 50 and more preferably 3 to 20 µm, and ultraviolet rays having a wavelength of 340 nm to 380 nm can be irradiated at 1000 to 5000 mJ/cm$^2$ by using a high pressure mercury lamp, a metal-halide lamp, or the like. The atmosphere under which the irradiation of active energy rays is conducted may be air atmosphere or may be atmosphere of inert gas such as nitrogen or argon.

Heating treatment may be performed between the step of application of the curable composition and the step of irradiation of active energy rays. The heating treatment can be performed by irradiation with a near-infrared lamp, circulation of hot air, or the like. In a case where the heating treatment is performed under the conditions including a substrate surface temperature in a furnace (hereinafter, referred to as the heating temperature) of 40 to 90° C. and a heating time of 60 to 180 seconds after the curable composition is applied, adhesiveness can be maintained outdoors over a long period of time. When the heating temperature is 40° C. or higher, an organic solvent or the like in the coated film can be sufficiently removed, and water resistance and weather resistance are improved. In addition, when the heating temperature is 90° C. or lower, appearance becomes favorable and weather resistance is improved. When the heating time is 60 seconds or longer, an organic solvent or the like in the coated film can be sufficiently removed, and water resistance and weather resistance are improved. In addition, when the heating time is 180 seconds or shorter, appearance becomes favorable and weather resistance is improved. The heating temperature is more preferably 50 to 70° C. and the heating time is more preferably 90 to 120 seconds.

The cured film obtainable by curing the curable composition according to the invention is excellent in wear resistance and weather resistance and has excellent appearance without cracks. For this reason, the curable composition according to the invention can be used for surface modification of various synthetic resin molded articles serving as the substrate. As the synthetic resins of the synthetic resin molded articles, there are mentioned various thermoplastic resins and thermosetting resins which are demanded for improvement in wear resistance and weather resistance. Examples of these resins include a polymethyl methacrylic resin, a polycarbonate resin, a polyester resin, a poly(polyester) carbonate resin, a polystyrene resin, an ABS resin (acrylonitrile-butadiene-styrene copolymer resin), an AS resin (acrylonitrile-styrene copolymer resin), a polyamide resin, a polyarylate resin, a polymethacrylimide resin, and a polyallyl diglycol carbonate resin. These may be used singly or in combination of two or more kinds thereof. In particular, since a polymethyl methacrylic resin, a polycarbonate resin, a polystyrene resin, and a polymethacrylimide resin are excellent in transparency and strongly demanded for improvement in wear resistance, the curable composition according to the invention is effectively applied. As the synthetic resin molded articles, there are mentioned sheet-shaped molded article, film-shaped molded articles, various injection molded articles of these resins.

In particular, the surface of an automobile headlamp lens, which is provided with a cured film of the curable composition according to the invention on the surface of a resin molded article such as a polycarbonate resin molded article, is covered with the cured film that is excellent in wear resistance and weather resistance and has excellent appearance without cracks, which is preferable. In addition, a laminate in which a cured film is formed by applying the curable composition to the surface of a polycarbonate resin molded article serving as the substrate and irradiating the curable composition with active energy rays is suitable as a polycarbonate resin molded article for a substitute for a window glass for an automobile.

EXAMPLES

Hereinafter, the invention will be described in more detail by way of Examples. Incidentally, "part(s)" indicates "part(s) by mass." In addition, evaluation in Examples and Comparative Examples was carried out by the following methods.

[Production of Dispersion Liquid (EA-CS1) Containing Surface-Modified Silica Particles]

An ethyl acetate dispersion liquid (EA-CS1) of surface-modified silica particles was prepared by the method described below. Into a three-neck flask of 200 mL provided with a stirrer, a thermometer, and a condenser, 120 g of ethyl acetate-dispersed silica sol (trade name: EAC-ST, manufactured by Nissan Chemical Industries, Ltd., dispersion medium: ethyl acetate, $SiO_2$ concentration: 30% by mass, average primary particle diameter: 15 nm, hereinafter, abbreviated as EAC-ST) as the component (a-1), 3.6 g of 3-methacryloyloxy propyltrimethoxysilane (trade name: KBM-503, manufactured by Shin-Etsu Chemical Co., Ltd., hereinafter, abbreviated as KBM-503), and 0.78 g of distilled water were put. The resultant mixture was heated under stirring, and hydrolysis and dehydration-condensation reaction were performed for 2 hours under reflux while stirring. Thereafter, alcohol, water, and the like were subjected to distillation together with toluene while stirring for 4 hours under normal pressure and under reflux. Further, the reaction was performed at about 80° C. for 2 hours while ethyl acetate was subjected to distillation to obtain a solid content concentration of 50% by mass. Accordingly, (EA-CS1) was obtained. (EA-CS1) was a translucent white dispersion liquid.

[Confirmation of Amount of Component (C) in (EA-CS1)]

The amount of the component (C) contained in (EA-CS1) prepared by the above-described method was confirmed by the following procedure. While 500 ml of hexane was stirred, 50 g of (EA-CS1) was slowly added thereto to perform reprecipitation, the solid-liquid separated hexane solution was concentrated under reduced pressure, and then the mass of the component (C) contained in (EA-CS1) was measured. The content of the component (C) contained in (EA-CS1) was 0.29% by mass (the content of (C) was 0.006 times in mass the content of (A)).

[Production of Dispersion Liquid (EA-CS2) Containing Surface-Modified Silica Particles]

(EA-CS2) was produced by the same method as in production of the (EA-CS1) described above, except that KBM-503 was changed to 3.39 g of 3-acryloyloxy propyltrimethoxysilane (trade name: KBM-5103, manufactured by Shin-Etsu Chemical Co., Ltd., hereinafter, abbreviated as KBM-5103) in the production of (EA-CS1) described above.

[Confirmation of Amount of Component (C) in (EA-CS2)]

Measurement was performed by the same method as in confirmation of the amount of the component (C) in (EA-CS1), except that (EA-CS1) was changed to (EA-CS2), and the content of the component (C) contained in (EA-CS2) was 0.18% by mass.

[Production of Silane Coupling Agent Condensate (CI)]

A toluene solution of surface-modified silica particles (TOL-CS) was prepared by the same method as in Synthesis Example 1 of Patent Literature 1, except that 3-methacryloyloxy propyltrimethoxysilane was changed from TSL-8370 (trade name) manufactured by Toshiba Silicones Co., Ltd. to KBM-503. Specifically, the toluene solution of surface-modified silica particles was prepared by the method described below.

Into a four-neck flask of 3 L provided with a stirrer, a thermometer, and a condenser, 2000 parts of isopropanol silica gel (trade name: IPA-ST, manufactured by Nissan Chemical Industries, Ltd., dispersion medium: isopropanol, $SiO_2$ concentration: 30% by mass, primary particle diameter: 12 nm, hereinafter, abbreviated as IPA-ST) and 382 parts of KBM-503 were put. The resultant mixture was heated under stirring, and 139 parts of 0.001 mol/L of hydrochloric acid aqueous solution was slowly added dropwise thereto at the same time when reflux of the volatile components was started. After completion of dropwise addition, hydrolysis was performed for 2 hours under reflux while stirring. After completion of hydrolysis, the volatile components such as alcohol and water were subjected to distillation under normal pressure. At the time point at which the concentration of the solid content (600 parts of $SiO_2$ of IPA-ST and 317 parts of KBM-503, that is, 917 parts in total) was 60% by mass, 600 parts of toluene was added, and alcohol, water, and the like were subjected to azeotropic distillation together with toluene. Further, 1500 parts of toluene was separately added in plural times and complete solvent substitution was performed to obtain a toluene dispersion system. The solid content concentration at this time was 40% by mass. Further, the reaction was allowed to occur for 4 hours at 110° C. while performing distillation of toluene so as to obtain a solid content concentration of 60% by mass. Accordingly, (TOL-CS) was obtained.

The amount of the component (C) contained in (TOL-CS) was confirmed by the following procedure. While 10000 parts of hexane was stirred, 1000 parts of (TOL-CS) was slowly added thereto to perform reprecipitation, and the content of the silane coupling agent condensate (the component (C), hereinafter, referred to as (CI)) in (TOL-CS) was confirmed to be 263 parts from the mass of residuals obtained by drying the solid-liquid separated hexane solution under reduced pressure.

Example 1

A curable composition was prepared by blending (EA-CS1), (B), (D), (E), and an organic solvent at blending ratios described in Table 1.

This curable composition was applied to a polycarbonate resin injection-molded plate (trade name: Panlite L-1225Z-100, clear, manufactured by TEIJIN LIMITED, thickness: 3 mm)) using a #26 bar coater and was heated and dried for 90 seconds in a dryer heated at 60° C. Then, the curable composition was irradiated with an ultraviolet ray of 1,800 mJ/cm$^2$ (integrated energy of ultraviolet ray having a wavelength of 320 to 380 nm, measured by UV-351 (trade name, manufactured by Orc Manufacturing Co., Ltd.) using a high pressure mercury lamp under air atmosphere to thereby obtain a wear resistance polycarbonate resin plate (laminate) provided with a cured film having a thickness of 10 μm.

Examples 2 to 11 and Comparative Examples 1 and 2

A laminate was obtained by the same method as in Example 1, except that, in Example 1, (EA-CS1) was changed to (EA-CS1) and (C1) and the blending ratios were changed as presented in Table 1.

Example 12

A laminate was obtained by the same method as in Example 1, except that, in Example 1, (EA-CS1) was changed to (EA-CS2) and the blending ratios were changed as presented in Table 1.

Comparative Examples 3 to 5

A laminate was obtained by the same method as in Example 1, except that, in Example 1, (EA-CS1) was changed to MIBK-SD and the blending ratios were changed as presented in Table 1.

The evaluation results are presented in Table 1 and FIG. 1.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Photoreactive colloidal silica | Type | EA-CS1 | EA-CS1 | EA-CS1 | EA-CS1 | EA-CS1 | EA-CS1 | EA-CS1 | EA-CS1 | EA-CS1 |
| | Solid content of component (A) | 29.83 | 29.5 | 29 | 28.5 | 28 | 19.5 | 19 | 11.5 | 19.5 |
| | Solid content of component (C) | 0.17 | 0.17 | 0.17 | 0.16 | 0.16 | 0.11 | 0.11 | 0.07 | 0.11 |
| | Part by mass of solution | 60 | 59.3 | 58.3 | 57.3 | 56.3 | 39.2 | 38.2 | 23.1 | 39.2 |
| Condensate | Type | | Cl | Cl | Cl | Cl | Cl | Cl | Cl | Cl |
| | Solid content of condensate | | 0.33 | 0.83 | 1.34 | 1.84 | 0.39 | 0.89 | 0.43 | 0.39 |
| Part by mass of component (A) | | 29.83 | 29.5 | 29.0 | 28.5 | 28.0 | 19.5 | 19.0 | 11.5 | 19.5 |
| Part by mass of component (C) | | 0.17 | 0.50 | 1.00 | 1.50 | 2.00 | 0.50 | 1.00 | 0.50 | 0.50 |
| Content of component (C) with respect to component (A) | | 0.006 | 0.017 | 0.034 | 0.053 | 0.071 | 0.026 | 0.053 | 0.043 | 0.026 |
| Component (B) | DPCA20 | 70 | 70 | 70 | 70 | 70 | 80 | 80 | 88 | |
| | DPHA | | | | | | | | | 40 |
| | M-315 | | | | | | | | | 40 |
| Component (D) | BP | 1 | 1 | 1 | 1 | 1 | 1 | 1 | 1 | 1 |
| | BDK | 1 | 1 | 1 | 1 | 1 | 1 | 1 | 1 | 1 |
| | MPG | 1 | 1 | 1 | 1 | 1 | 1 | 1 | 1 | 1 |
| Component (E) | TINUVIN 400 | 3 | 3 | 3 | 3 | 3 | 3 | 3 | 3 | 3 |
| Organic solvent | PGM | 223 | 223 | 223 | 223 | 223 | 223 | 223 | 223 | 223 |
| | ECA | 10 | 10 | 10 | 10 | 10 | 10 | 10 | 10 | 10 |
| Total | | | 428 | 427 | 426 | 425 | 398 | 397 | 374 | 398 |
| Wear resistance evaluation | DHx | 9.2 | 9.4 | 11.5 | 15.3 | 11.7 | 14.3 | 14.3 | 16.3 | 6.5 |
| Weather resistance evaluation | DHy | 0 | 0.5 | 0 | 0 | 0.2 | 0 | 0 | 0 | 0 |

TABLE 1-continued

| | | Example 10 | Example 11 | Example 12 | Comparative Example 1 | Comparative Example 2 | Comparative Example 3 | Comparative Example 4 | Comparative Example 5 |
|---|---|---|---|---|---|---|---|---|---|
| Photoreactive colloidal silica | Type | EA-CS1 | EA-CS1 | EA-CS2 | EA-CS1 | EA-CS1 | MIBK-SD | MIBK-SD | MIBK-SD |
| | Solid content of component (A) | 19.5 | 19.5 | 19.93 | 27.5 | 5.5 | 27.5 | 18.3 | 11.0 |
| | Solid content of component (C) | 0.11 | 0.11 | 0.07 | 0.16 | 0.03 | 2.5 | 1.7 | 1.0 |
| | Part by mass of solution | 39.2 | 39.2 | 40.1 | 55.3 | 11.1 | 100.0 | 66.7 | 33.3 |
| Condensate | Type | Cl | Cl | | Cl | Cl | | | |
| | Solid content of condensate | 0.39 | 0.39 | | 2.34 | 0.47 | | | |
| Part by mass of component (A) | | 19.5 | 19.5 | 19.9 | 27.5 | 5.5 | 27.5 | 18.3 | 11.0 |
| Part by mass of component (C) | | 0.50 | 0.50 | 0.07 | 2.50 | 0.50 | 2.5 | 1.7 | 1.0 |
| Content of component (C) with respect to component (A) | | 0.026 | 0.026 | 0.004 | 0.091 | 0.091 | 0.091 | 0.093 | 0.091 |
| Component (B) | DPCA20 | | | 80 | 70 | 94 | 70 | 80 | 88 |
| | DPHA | 20 | 60 | | | | | | |
| | M-315 | 60 | 20 | | | | | | |
| Component (D) | BP | 1 | 1 | 1 | 1 | 1 | 1 | 1 | 1 |
| | BDK | 1 | 1 | 1 | 1 | 1 | 1 | 1 | 1 |
| | MPG | 1 | 1 | 1 | 1 | 1 | 1 | 1 | 1 |
| Component (E) | TINUVIN 400 | 3 | 3 | 3 | 3 | 3 | 3 | 3 | 3 |
| Organic solvent | PGM | 223 | 223 | 223 | 223 | 223 | 223 | 223 | 223 |
| | ECA | 10 | 10 | 10 | 10 | 10 | 10 | 10 | 10 |
| Total | | 398 | 398 | 399 | 424 | 356 | 469 | 426 | 384 |
| Wear resistance evaluation | DHx | 4.6 | 7.4 | 8.9 | 12.9 | 20.4 | 10.4 | 13.7 | 19.1 |
| Weather resistance evaluation | DHy | 0.3 | 1.1 | 0 | 3.7 | 1 | 4 | 1.6 | 1.2 |

Incidentally, each compound in Table 1 is as follows.
MIBK-SD: methyl isobutyl ketone-dispersed silica sol (manufactured by Nissan Chemical Industries, Ltd., dispersion medium: methyl isobutyl ketone, $SiO_2$ concentration: 30% by mass, average primary particle diameter: 10 to 15 nm) DPCA20: acrylation product of an adduct of 1 mol of dipentaerythritol and 2 mols of ε-caprolactone (trade name: KAYARAD DPCA-20, manufactured by Nippon Kayaku Co., Ltd.)
DPHA: dipentaerythritol hexaacrylate (trade name: ARONIX M-406, manufactured by TOAGOSEI CO., LTD.)
M-315: tris(2-acryloxyethyl)isocyanurate (trade name: ARONIX M-315, manufactured by TOAGOSEI CO., LTD.)
BP: benzophenone
BDK: benzyl dimethyl ketal
MPG: methylphenylglyoxylate
TINUVIN 400: 2-[4-[(2-hydroxy-3-dodecyloxypropyl)oxy]-2-hydroxyphenyl]-4,6-bis(2,4-dimethylphenyl)-1,3,5-triazine (trade name, manufactured by BASF Japan Ltd.)
PGM: propylene glycol monomethyl ether
ECA: ethyl carbitol acetate As clearly seed from Table 1 and FIG. 1, it is obvious that the curable composition according to the invention is excellent in weather resistance and wear resistance. In Comparative Examples 1 and 3 to 5, since the content of the component (C) is large, the ΔHy value of the weather resistance evaluation result is large and this value represents that the weather resistance is low. In addition, in Comparative Example 2, since the content of the component (A) is small, ΔHx of the wear resistance evaluation result is large and this value represents that the wear resistance is low.

This application claims priority to Japanese Patent Application No. 2014-071226 which has been filed on Mar. 31, 2014, and the entire contents of their disclosure are incorporated herein by reference.

Hereinabove, the invention of the present application is described with reference to the embodiments and examples. However, the invention of the present application is not limited to the above-described embodiments and examples. Various modifications that can be understood by a person skilled in the art can be made within the constitution of the invention of the present application, or specifically, within the scope of the invention of the present application.

The invention claimed is:
1. A curable composition, comprising:
(A) surface-modified silica particles obtained by reacting 5 to 20 parts by mass of a compound (a-2) of Formula (1) with 100 parts by mass of silica particles (a-1) having an average primary particle diameter of 500 am or less, the average primary particle diameter being calculated from a specific surface area measured by a BET adsorption method defined in JIS Z8830:

$$R^1{}_l\!\!-\!\!SiR^2{}_m R^3{}_n \qquad (1),$$

where $R^1$ represents a functional group containing a (meth)acryloyl group, $R^2$ represents a hydrolyzable functional group or a hydroxyl group, $R^3$ represents a substituent other than $R^1$ and $R^2$, 1 is an integer of 1 to 3, m is an integer of 1 to 3, and n is an integer of 0 to 2, provided that l+m+n=4;
(B) a compound that is at least one selected from the group consisting of tris(2-(meth)acryloxyethyl) isocyanurate; caprolactone-modified dipentaerythritol hexa (meth)acrylate, which is a (meth)acrylation product of an adduct of dipentaerythritol and ε-caprolactone; caprolactone-modified dipentaerythritol hydroxy penta (meth)acrylate; ditrimethylol propane tetra(meth)acrylate; an epoxy poly(meth)acrylate; and a urethane poly (meth)acrylate;
(C) a compound of the Formula (1) and/or a condensate thereof;
(D) a photopolymerization initiator; and (E) an ultraviolet absorbing agent that is at least one compound derived from benzophenone, benzotriazole, and hydroxyphenyltriazine, wherein a content of (A) is 10 to 35% by mass with respect to 100% by mass of (A) to (C) in total, a content of (B) is 65 to 90% by mass with respect to 100% by mass of (A) to (C) in total, a content of (C) is 0 to 0.08 times in mass of content of (A), a content of (D) is 0.01 to 10 parts by mass with respect to 100 parts by mass of (A) to (C) in total, and a content of (E) is 1 to 5 parts by mass with respect to 100 parts by mass of (A) to (C) in total.

2. The curable composition according to claim 1, further comprising a light stabilizer (F), wherein a content of (F) is 0.01 to 3 parts by mass with respect to 100 parts by mass of (A) to (C) in total.

3. A laminate, comprising a cured film of the curable composition according to claim 1 on a substrate.

4. The laminate according to claim 3, wherein a thickness of the cured film is 5 to 20 μm.

5. An automobile headlamp lens, comprising a cured film of the curable composition according to claim 1 on a surface of a resin molded article.

6. The automobile headlamp lens according to claim 5, wherein a thickness of the cured film is 5 to 20 μm.

7. The automobile headlamp lens according to claim 5, wherein the resin molded article is a polycarbonate resin molded article.

8. The curable composition according to claim 1, wherein the curable composition does not contain urethane poly (meth)acrylate.

* * * * *